US011108906B2

(12) United States Patent
Shen

(10) Patent No.: US 11,108,906 B2
(45) Date of Patent: Aug. 31, 2021

(54) TERMINAL CONTROL METHOD AND TERMINAL BASED ON ANTENNA AND NOISE INTERFERENCE FEEDBACK

(71) Applicant: ZTE CORPORATION, Guangdong (CN)

(72) Inventor: Shaowu Shen, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 69 days.

(21) Appl. No.: 16/608,459

(22) PCT Filed: Apr. 26, 2018

(86) PCT No.: PCT/CN2018/084615
§ 371 (c)(1),
(2) Date: Oct. 25, 2019

(87) PCT Pub. No.: WO2018/196806
PCT Pub. Date: Nov. 1, 2018

(65) Prior Publication Data
US 2021/0112155 A1    Apr. 15, 2021

(30) Foreign Application Priority Data
Apr. 26, 2017  (CN) .......................... 201710283851.5

(51) Int. Cl.
*H04M 1/00*        (2006.01)
*H04M 1/72454*     (2021.01)
(Continued)

(52) U.S. Cl.
CPC ........ *H04M 1/72454* (2021.01); *H01Q 1/243* (2013.01); *H04M 1/725* (2013.01); *H04M 1/72403* (2021.01); *H04M 1/72463* (2021.01)

(58) Field of Classification Search
CPC ........ H04M 1/72454; H04M 1/72463; H04M 1/72403; H04M 1/725; H01Q 1/243
See application file for complete search history.

(56) References Cited

U.S. PATENT DOCUMENTS 9,788,162 B2    10/2017  Maguire
2012/0252378 A1 10/2012  Teshima
(Continued)

FOREIGN PATENT DOCUMENTS

CN    102006367 A    4/2011
CN    103368552 A    10/2013
(Continued)

OTHER PUBLICATIONS

WIPO, International Search Report dated Jun. 19, 2018.
(Continued)

*Primary Examiner* — Pakee Fang

(57) ABSTRACT

Embodiments of the present disclosure disclose a terminal and a control method thereof. Cooperation between a target sensing object in the terminal and a target object to be sensed external to the terminal may affect a received signal on the target antenna loop, and control of the terminal may be implemented according to a change of the received signal. The method includes: detecting a received signal on a target antenna loop in the terminal and acquiring a signal parameter of the received signal; and determining whether the signal parameter of the received signal matches a preset target signal parameter, and triggering control of a to-be-controlled function of the terminal when the signal parameter of the received signal matches the preset target signal parameter.

12 Claims, 10 Drawing Sheets

(51) Int. Cl.
*H04M 1/72463* (2021.01)
*H04M 1/72403* (2021.01)
*H01Q 1/24* (2006.01)
*H04M 1/725* (2021.01)

(56) References Cited

U.S. PATENT DOCUMENTS

| | | | |
|---|---|---|---|
| 2013/0241796 A1* | 9/2013 | Nagumo | H01Q 21/28 343/861 |
| 2014/0306857 A1* | 10/2014 | Bevelacqua | H01Q 9/0442 343/750 |
| 2014/0323063 A1* | 10/2014 | Xu | H01Q 9/0442 455/77 |
| 2016/0037361 A1* | 2/2016 | Maguire | H04W 4/023 455/73 |
| 2018/0069295 A1* | 3/2018 | Han | H01Q 1/245 |

FOREIGN PATENT DOCUMENTS

| | | |
|---|---|---|
| CN | 103728906 A | 4/2014 |
| CN | 204203931 U | 3/2015 |
| CN | 105165110 A | 12/2015 |
| CN | 106325473 A | 1/2017 |

OTHER PUBLICATIONS

China Patent Office, First Office Action dated Jul. 30, 2020 for application No. CN201710283851.5.
The State Intellectual Property Office of People's Republic of China. Second Office Action dated Mar. 1, 2021, Chinese Application No. 201710283851.5.

\* cited by examiner

TERMINAL CONTROL METHOD AND TERMINAL BASED ON ANTENNA AND NOISE INTERFERENCE FEEDBACK

CROSS REFERENCE TO RELATED APPLICATION

This application is a National Phase Application filed under 35 U.S.C. 371 as a national stage of PCT/CN2018/084615, filed on Apr. 26, 2018, an application claiming the priority of the Chinese patent application No. 201710283851.5, filed on Apr. 26, 2017, the contents of which are incorporated herein by reference in their entirety.

TECHNICAL FIELD

The present disclosure relates to a terminal field, and in particular, to a terminal and a control method thereof.

BACKGROUND

With popularization of terminals such as mobile phones, IPADs, eReaders, and smart wearable devices, people have put forward new demands for terminals, such as convenience of operation, terminal interactivity, entertainment, intelligence, etc., which requires a new faster manner of sensing operation control. At present, the operation control of terminals such as mobile phones, smart watches and IPADs is mainly control operation based on direct touch on a resistance screen or a capacitive screen. A user needs to perform a corresponding touch operation directly on the touch screen through a finger or a dedicated stylus, that is, the operation is not interesting. In addition, terminals have developed in two extreme directions, miniaturization and interface enlargement. For a miniaturized terminal (such as a smart bracelet, a smart watch, etc.), there may be a cases where the screen interface is too small or having no interface, which brings great inconvenience to operation of a user. For a large-size mobile phone (such as a smartphone or a PAD larger than 5 inches), there may also be a problem that an interface cannot be covered by one hand of the user since the interface is too large and the hands of the user are too small, leading to inconvenience of operation of the user.

SUMMARY

Embodiments of the present disclosure provide a terminal and a control method thereof to provide a terminal control solution for solving various problems of touch operations based on a touch screen in existing terminals.

According to an embodiment of the present disclosure, a terminal control method includes: detecting a received signal on a target antenna loop in the terminal and acquiring a signal parameter of the received signal; and determining whether the signal parameter of the received signal matches a preset target signal parameter, and triggering control of a to-be-controlled function of the terminal when the signal parameter of the received signal matches the preset target signal parameter. The target antenna loop corresponds to a target sensing object in the terminal and a target object to be sensed external to the terminal, and the target sensing object and the target object to be sensed are preset according to the to-be-controlled function. An interference signal that acts on the target antenna loop is generated during an approach or contact process between the target sensing object and the target object to be sensed, and the interference signal affects the signal parameter of the received signal.

According to an embodiment of the present disclosure, there is further provided a terminal including: a signal detection module configured to detect a received signal on a target antenna loop in the terminal and acquiring a signal parameter of the received signal; and a control module configured to determine whether the signal parameter of the received signal matches a preset target signal parameter, and trigger control of a to-be-controlled function of the terminal when the signal parameter of the received signal matches the preset target signal parameter. The target antenna loop corresponds to a target sensing object in the terminal and a target object to be sensed external to the terminal, and the target sensing object and the target object to be sensed are preset according to the to-be-controlled function. An interference signal that acts on the target antenna loop is generated during an approach or contact process between the target sensing object and the target object to be sensed, and the interference signal affects the signal parameter of the received signal.

According to an embodiment of the present disclosure, there is further provided a computer storage medium storing thereon a computer program, which causes, when executed by a processor, the processor to perform the terminal control method according to the present disclosure.

DETAILED DESCRIPTION

Figure 1:
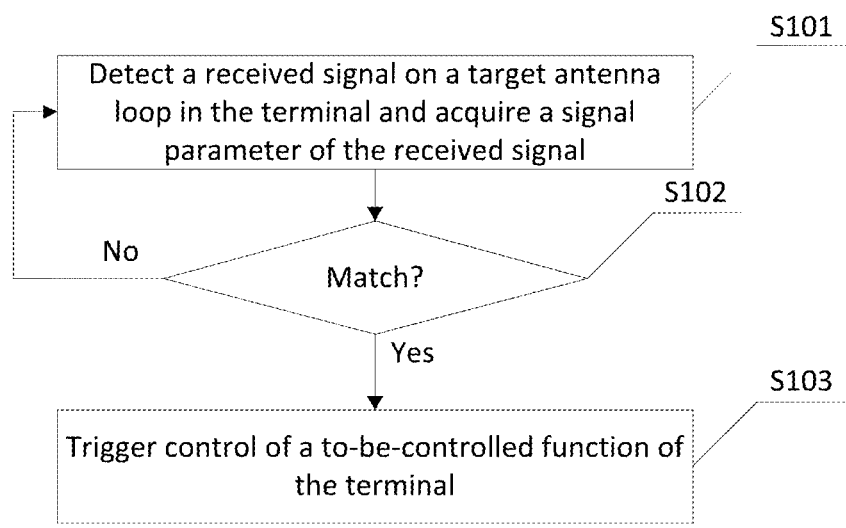
FIG. 1 is a schematic flow chart illustrating a terminal control method according to an embodiment of the present disclosure.

Embodiments of the present disclosure are further described in detail below by specific embodiments in conjunction with accompanying drawings.

According to embodiments of the present disclosure, cooperation between a target sensing object in the terminal and a target object to be sensed external to the terminal may affect a received signal on the target antenna loop, and control of the terminal may be implemented according to a change of the received signal. This is totally different from a control principle in related art that the terminal performs control based on a touch screen, and a control operation mode presented to a user is also different. According to embodiments of the present disclosure, a size of the terminal screen may be no longer limited, which not only enriches control modes of the terminal, but also improves convenience of control, moreover, any modification or upgrade of the terminal hardware is not required, thereby greatly improving satisfaction of user experience.

In order to facilitate understanding of the present disclosure, an antenna loops in the terminal and corresponding devices are exemplified below.

Terminals such as mobile terminals and smart wearable devices, due to a need for long-distance call and data transmission, will have cellular communication antennas, such as a 2G, a 3G, a 4G and a 5G communication antenna, due to a need for short-distance data transmission and audio transmission, will have a Bluetooth, a WIFI function antenna and other 2.4G/5G ISM (Industrial Scientific Medical) band function antenna, due to a need for satellite positioning, will have a Global Positioning System (GPS), a Global Navigation Satellite System (GLOBAL NAVIGATION SATELLITE SYSTEM, GLONASS), a Beidou, a Galileo function antenna and other functional antenna, and due to a need for short-range radio frequency identification and transmission, will have a NFC low-frequency functional antenna. Each of these antennas has a signal transmitting circuit and a signal receiving circuit in the terminal, and there is a coupling loop between the signal transmitting circuit and the signal receiving circuit. The signal transmitted by the signal transmitting circuit may be connected to the signal receiving circuit through a coupling loop to form a received signal of the signal receiving circuit. In addition, the transmitted signal may be connected to the signal receiving circuit before the transmitted signal reaches a corresponding antenna, or may be connected to the signal receiving circuit after the transmitted signal reaches the antenna. Generally, different antennas have respective corresponding signal transmitting circuit and signal receiving circuit. The signal transmitting circuit, the signal receiving circuit, and the corresponding coupling loop form the antenna loop in embodiments of the present disclosure. In general, different antennas have different antenna loops and different antennas have different physical locations on the terminal. Therefore, the influence of each target sensing object on the terminal on each antenna loop is related to the power of the antenna loop itself and its physical position on the terminal.

In an embodiment of the present disclosure, during an approach or contact process between some objects on the terminal, such as an antenna and an internal component in the terminal (including but not limited to: a motor, a speaker, a backlight module, a touch screen, a Universal Serial Bus (USB) module, a front camera, a rear camera, etc.), and some objects external to the terminal (including but not limited to: a human body part or an external object), an interference signal acting on the antenna loop may be generated, thereby affecting the signal parameter of the received signal on the antenna loop. The signal parameter includes, but is not limited to: a noise parameter, a level value, and the like. The following is an example of some specific application scenarios.

For each antenna on the terminal, during an approach or contact process between the antenna and an object external to the terminal (for example, human body or other object), because of influence of dielectric constant of the object to be approached to or to be contacted with, the radiation characteristics of the antenna will be greatly affected during use since affection by antenna effect of the antenna itself due to the object to be approached to or to be contacted with being in a region of a near magnetic field of the antenna, which means a radiation effect of the RF signal emitted by the antenna would be refracted, reflected and blocked. Signals that are refracted, reflected, and blocked are returned to the antenna, thereby affecting the received signal on the signal receiving circuit of the antenna. This kind of the signal is an interference signal that affects the signal parameter of the received signal on the antenna loop, that is, the antenna may sense the external object. Different external objects, different distances to an external object, and different motion states have different effects on different kinds of antennas and antenna parameters of the terminal. By acquiring, counting, and analyzing changes of these parameters, the changes of these parameters may be used to trigger control of a corresponding function of the terminal.

The terminal itself includes some components, such as a motor, a speaker, an LCD, a backlight, a touch screen, a USB module, a front camera, a rear camera, etc., and also includes some chips, such as a GPS chip, a WIFI chip, a fingerprint identification chip, and the like. Due to a limitations of board routing, a power line, a clock line, a control line, and/or a data line for high speed transmission of these devices and chips are close to or adjacent to a main frequency line of the terminal. Therefore, when these devices and chips are working, due to factors such as a power supply clock or data transmission, an interference and influence may be generated on a main and diversity of the communication frequency band of the terminal (for example, including but not limited to: GSM (Global System for Mobile Communication)/WCDMA (Wideband Code Division Multiple Access)/CDMA (Code Division Multiple Access)/LTE (Long Term Evolution), resulting in a change in the level of the received signal on the corresponding antenna loop of the terminal. When an external object approaches or contacts a corresponding part of the terminal, since the external object itself has a certain dielectric constant (or a certain conductivity), a approach or contact surface of the terminal is equivalent to a near-field planar antenna, so that the noise generated when the device or chip is working is continuously reflected by an object close to the antenna area of the terminal, thus an original low-noise interference signal is further enhanced. As a duty cycle of the device and the chip hops regularly, the electromagnetic signal reflected back by the hopping interference signal is connected to the antenna loop region of the terminal, forming a secondary mixing, which affects the antenna loop of the terminal, such that the level value of the received signal detected on the antenna loop of the terminal also changes regularly (e.g., periodically). This regular change may also be used to trigger control of a corresponding function of the terminal.

According to an embodiment of the present disclosure, approach sensing or contact sensing control of the terminal is achieved by detecting a regular change of a received signal on a corresponding antenna loop in a terminal caused by a corresponding sensing object on the terminal during an approach or contact process between an object (i.e., an object to be sensed) and the terminal.

According to an embodiment of the present disclosure, there may be multiple antenna loops on the terminal, and there may be multiple sensing objects on the terminal (e.g., each antenna of the terminal or a component inside the terminal that generates an interference signal to the antenna loop). In addition, the object to be sensed external to the terminal may be configured as a different objects according to a specific application. Cooperation between the sensing object on the terminal and the object to be sensed external to the terminal may affect different antenna loops, and different cooperation modes (for example, approach, contact, and a specific approach mode, a specific contact mode, etc.) may affect generation of the received signals on the antenna loop differently. Therefore, according to an embodiment of the present disclosure, each to-be-controlled function of the terminal may be associated with a corresponding sensing object and an object to be sensed, and a corresponding antenna loop is selected according to an antenna loop that the sensing object may affect.

According to an embodiment of the present disclosure, a to-be-controlled function (e.g., an unlock function) of a terminal, a target sensing object (e.g., an LTE antenna) and a target object to be sensed (e.g., a hand) that triggers control of the to-be-controlled function, and a target antenna loop (e.g., an LTE antenna loop) on the terminal corresponding to the target sensing object and the target object to be sensed may be configured first. During an approach or contact process between the configured target sensing object and the configured target object to be sensed, an interference signal acting on the target antenna loop may be generated, thereby affecting the signal parameter of the received signal on the target antenna loop. The target sensing object and the target object to be sensed may approach or contact in advance, and a received signal on the target antenna loop may be measured during the approach or contact process to obtain a target signal parameter, which may be regarded as a reference parameter.

FIG. 1 is a schematic flow chart illustrating a terminal control method according to an embodiment of the present disclosure.

As shown in FIG. 1, the terminal control method according to an embodiment of the present disclosure may include steps S101 to S103.

At step S101, a received signal on a target antenna loop in the terminal is detected, and a signal parameter of the received signal is acquired.

At step S102, whether the signal parameter of the received signal matches a preset target signal parameter is determined. If matches, the process turn to step S103; otherwise, the process turn to step S101.

At step S103, control of a to-be-controlled function of the terminal is triggered.

Through the above process, cooperation between a target sensing object in the terminal and a target object to be sensed external to the terminal may affect a received signal on the target antenna loop, and control of the terminal may be implemented according to a change of the received signal, such that the control of the terminal may not be restricted by a size of a terminal screen, enriching control mode of the terminal and improving satisfaction of user experience.

According to an embodiment of the present disclosure, when configuring a target sensing object for a to-be-controlled function, the target sensing object may be an antenna on the target antenna loop and/or at least one interference source component within the terminal.

In a case where the target sensing object is the antenna on the target antenna loop, the antenna and an external target object to be sensed (for example, a hand of the user or other objects) may affect the received signal on the target antenna loop during an approach or contact process therebetween. When the target sensing object is at least one interference source component in the terminal, the interference source component may generate a noise signal during operation, and the noise signal may be reflected to a component of the target antenna loop under an action of the external target object to be sensed, which may affect the received signal on the target antenna loop.

According to an embodiment of the present disclosure, the target object to be sensed may include at least one of a human body part and an object external to the terminal.

For example, the target object to be sensed may include at least one of a hand, a face, or may be any part of a human body. In addition, the target object to be sensed may include at least one of a desktop (including a desktop of various materials or shapes), a wallet, a clothes pocket, and an electronic apparatus.

According to an embodiment of the present disclosure, the manner of cooperation between the sensing object in the terminal and the target object to be sensed external to the terminal may be gradually approaching or contacting, and the contact may further include full contact or partial contact.

According to an embodiment of the present disclosure, the received signal on the detected target antenna loop is reference signal transmitted from a signal transmitting circuit of the target antenna loop and connected to a signal receiving circuit of the target antenna loop, that is, the target antenna loop may implement reception of the received signal by self-transmitting and self-receiving and acquire a signal parameter of the received signal. According to an embodiment of the present disclosure, theoretically, the signal parameter may be any parameter that may reflect the cooperation between the external object to be sensed and the sensing object in the terminal, for example, may be a noise parameter or a level value of the received signal.

According to an embodiment of the present disclosure, when detecting the received signal on the target antenna loop, the received signal on the target antenna loop may be scanned at one or more preset frequency points respectively, to obtain a corresponding signal parameter.

The received signal on the target antenna loop may be scanned M times at at least one preset frequency point respectively, and M levels of the received signals are acquired at the at least one preset frequency point respectively, wherein M is an integer greater than or equal to 1. A number of preset frequency points and a number of scans at each preset frequency point may be configured according to a specific need.

According to an embodiment of the present disclosure, when M is equal to 1, that is, the received signal on the target antenna loop is scanned once at the at least one preset frequency point, the preset target signal parameter may include a target signal level value at the at least one preset frequency point. In this case, the step of determining whether the signal parameter of the received signal matches the preset target signal parameter (i.e., step S102) may include: the level value of the received signal respectively obtained at the at least one preset frequency point is compared with the corresponding target signal level value at the preset frequency point, and whether the two are matched is determined according to the comparison result. For example, whether the two are matched may be determined according to whether a difference between the two is within a preset range, or according to a size relationship of the two, and the like.

According to an embodiment of the present disclosure, when M is greater than 1, that is, at least two scans are performed on the received signal on the target antenna loop at the at least one preset frequency point, and level values of at least two received signals are acquired, and the preset target signal parameter may include at least two target signal level values at the at least one preset frequency point. In this case, the step of determining whether the signal parameter of the received signal matches the preset target signal parameter (i.e., step S102) may include: comparing a level fluctuation profile formed based on level values of at least two received signals with a target level fluctuation profile formed based on the at least two target signal level values.

Single or multiple level values may be selected for comparison according to a specific need, or a level fluctuation profile may be used for comparison. When comparing with a plurality of level values or comparing with a level fluctuation profile, a movement trend or the track state between the sensing object in the terminal and the external object to be sensed may be reflected to some extent.

According to an embodiment of the present disclosure, when scanning a received signal on a target antenna loop, in order to avoid a problem where a detection result is inaccurate due to interference from other interference signals, before detecting the received signal on the target antenna loop in the terminal (for example, when the terminal is powered on, or when the terminal detects a relatively large change in the position of the terminal), the terminal control method according to the embodiment of the present disclosure may further include: acquiring interference signals inside and external to the terminal; and obtaining a harmonic frequency of each interference signal, and determining whether the harmonic frequency is within a working frequency range of the terminal, wherein if the harmonic frequency is within the working frequency range of the terminal, a frequency point within the working frequency range corresponding to the harmonic frequency is marked as the interference frequency point, to avoid scanning at these interference frequencies. In this way, when selecting the preset frequency points afterwards, the preset frequency points may be selected from each frequency point in the working frequency band range that is not marked as the interference frequency point.

For example, external interference scanning is first performed, that is, a full-band scanning is performed on ambient noise of the terminal to determine which frequency bands have strong interference and which frequency bands do not have interference. Through the control, the terminal enters a self-test mode for reception level, and performs a fast self-test on the full-band and all channels. This operation may be performed after the terminal is restarted, or it may be performed after the terminal moves to a certain area and experiences a large change in the latitude and longitude. This operation may be automatically started and executed in the background. For example, in the current environment, 2100 MHz or 850 MHz is a channel of public network, and some channels thereof (for example, intermediate channels) have large interferences, and these interferences may cause large interference and fluctuations in subsequent reception of signals and detection of noise, which is not conducive to the detection of the level stability of the received signal. Therefore, these frequency bands and frequency points tested as unstable or having irregular received signal hopping may be recorded. In a subsequent self-test of sensing scan, these bands are automatically avoided and the interference frequency is skipped to obtain a stable detection condition.

According to an embodiment of the present disclosure, in addition to marking the interference frequency points, interference may also be eliminated by hardware. For example, when interference is detected, the antenna switch is controlled to switch a RF path to other non-interfering frequency bands, and transmission and reception communication as well as sensing detection are performed on the non-interfering frequency band. In addition, a band pass filter bank is connected after each RF switch to further limit and filter out an external broadband noise, such that an external signal entered the antenna of the terminal is not an interference signal.

By excluding the interference signal, the detection may be more stable and reliable, and the control operation based on this is more accurate, which can further improve the satisfaction of user experience.

Figure 2:
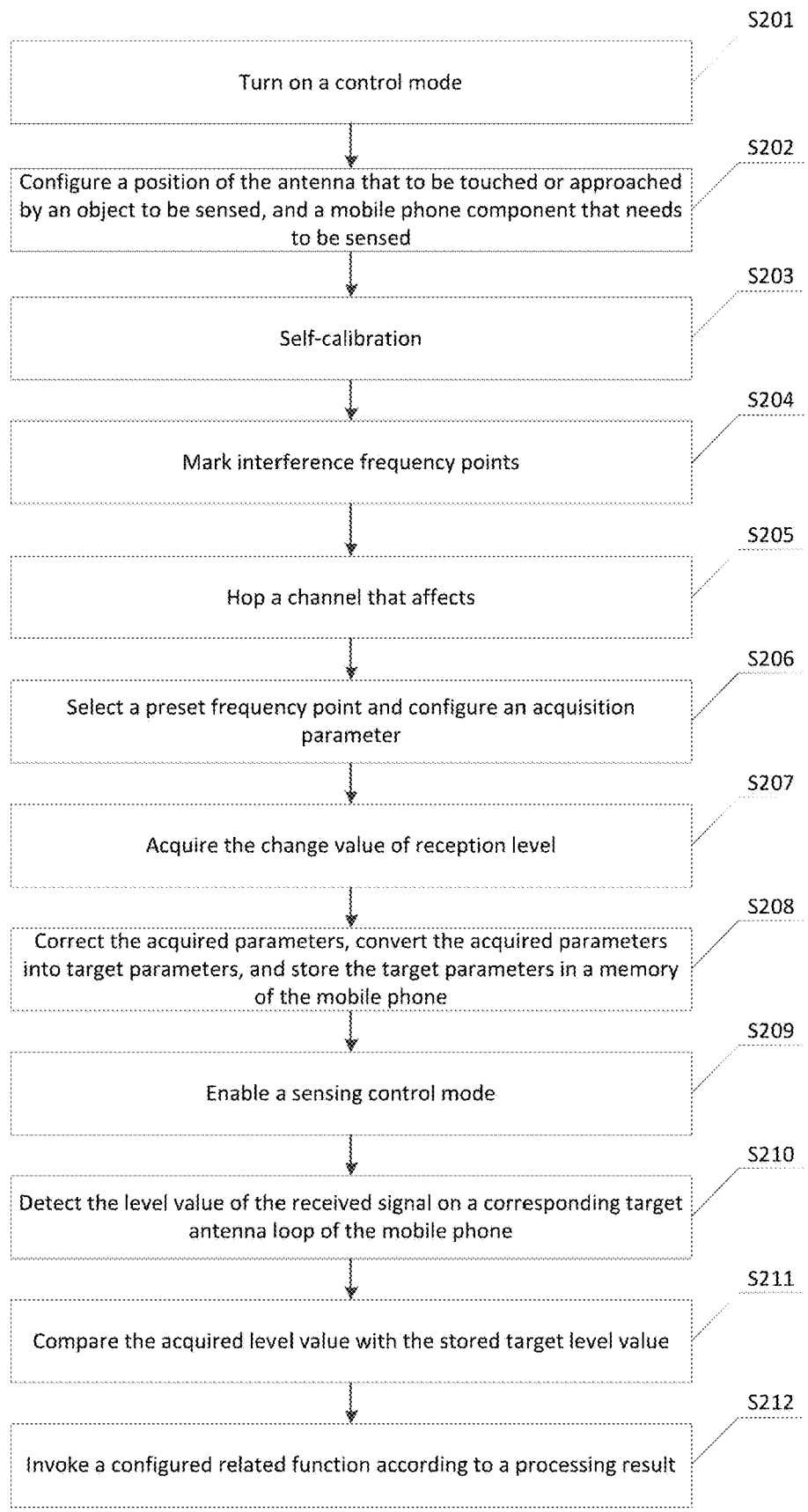
FIG. 2 is a schematic flow chart illustrating a terminal control method according to another embodiment of the present disclosure.

FIG. 2 is a schematic flow chart illustrating a terminal control method according to another embodiment of the present disclosure.

For better understanding of the present disclosure, an embodiment of the present disclosure provides an example of a complete process of terminal control based on the foregoing embodiments, by taking a case where the terminal is a mobile phone as an example.

Referring to FIG. 2, a terminal control method according to another embodiment of the present disclosure may include steps S201 to S212.

At step S201, a control mode according to the present disclosure is turned on, which includes turning on an adaptive sensing control identification mode of a relevant component and an antenna, and associating a related mobile phone operation, function, radio configuration, communication, and the like.

At step S202, when a user first uses the system, the user may configure, according to a need, a position of the antenna that to be touched or approached by an object to be sensed, such as a human body or an object, and configure a mobile phone component (which may be an antenna or an interference source component) that needs to be sensed.

In this step, the user may configure a mobile phone function which needed to be performed in a screen-off state or a screen-on state, an antenna area (i.e., the antenna loop), a type of contact object (such as the human body), a sensing component or the antenna to be detected, and so on. It is also possible to configure parameters and sensitivity related to sensing identification (for example, level values and associated level value thresholds). The sensitivity is used to achieve precision control. For example, a range of a difference between detected parameters (e.g., level values) and preset target parameters (e.g., level thresholds) may be configure, to configure the accuracy of the control.

For example, functions that may be controlled, in a control manner provided by the present disclosure, through an interactive interface by the user may include but is not limited to: unlocking, locking, answering a phone, mute, vibration mode, flight mode, Bluetooth interconnection, WIFI interconnection, GPS positioning, etc. In addition, the above-mentioned functions to be controlled may be configure in one-to-one correspondence with the target antenna loop, the target sensing object, and an external target object to be sensed (for example, a human body or other contact objects).

Antenna loops to be used may be selected by configuring a location of the mobile phone antenna corresponding to the sensing function, for example, a LTE main antenna in a lower left corner, a CDMA main antenna in a lower right corner, a diversity antenna in an upper left corner, a GPS antenna in an upper right corner, a WIFI and Bluetooth antenna on a right side, central NFC antenna, etc.

The object to be contacted (i.e., the object to be sensed) may include, but is not limited to: a desktop, a human hand, a wallet, a pocket, an electronic apparatus (e.g., another mobile phone, a wearable smart apparatus, a Bluetooth headset, etc.).

The sensing object (i.e., the sensing component on the mobile phone) may include a motor in the mobile phone, an LCD, a front camera, a rear camera, a speaker, a fingerprint chip, a GPS chip, a WIFI chip, a radio frequency cellular chip, etc., or may be an antenna on the antenna loop.

At step S203, the mobile phone invokes a received noise parameter and a model of the received signal level reference value in a working mode and an off mode of each antenna and component in a shielding environment, to perform self-calibration.

At S204, the mobile phone turns on a frequency band and signal scanning mode, detects external radio communication signals or other interference signals, and simultaneously acquires internal or external interference signals of the mobile phone, and calculates multiple harmonic frequencies of each interference signal according to an operation frequency of each interference signal, and marks the harmonic frequency falling within an acquisition working frequency band as an interference frequency point.

During operation of the RF signal, there will be two or more harmonics, an intermodulation signal, etc., as well as a conducted spurious signal and a radiated spurious signal. For a received signal, there will be mixed interference between transmission and reception. Therefore, in actual sensing control, it is necessary to eliminate the influence of interference of an external noise and a noise of the mobile phone itself.

At step S205, an antenna switch and a band pass filter group of the mobile phone may be switched to the anti-interference frequency band by, for example, an interference shielding module of the mobile phone, and at the same time, full channel scan and detection is performed on a selected frequency band, wherein frequency hopping processing is performed for a channel that affects. The interference shielding module may shield external interference through two parts. A first part is a hardware part. When interference is detected, the antenna switch is controlled to switch the RF path to other non-interfering frequency band, and transmission and reception communication and sensing detection is performed on the non-interference frequency band. In addition, a band pass filter bank is connected after each RF switch to further limit and filter out external broadband noise, such that an external signal entered the mobile phone antenna is not an interference signal. A second part is software shielding, wherein a known external interference channel or frequency point is filtered out after scanning on the full channel or a local channel, and at the same time, multiple harmonic frequencies of a test channel is filtered out, such that merely clean frequencies or channels are scanned in a sensing scanning.

At step S206, a corresponding level value, a frequency band, a channel, a bandwidth, a mixing mode, a trip point or a change value of a reception level, and the like are configured, that is, a preset frequency point is selected and an acquisition parameter is configured.

At step S207, after the object to be sensed contacts or approaches the sensing object, the change value of reception level when a corresponding component is turned on and off is acquired.

A most sensitive component may be selected for acquiring level change values. Whether the acquisition is successful is detected corresponding to frequency points and a position of the antenna. If the acquisition is successful and identifiable, the sensing working mode may be entered. If the acquisition fails, then a re-acquisition may be prompted.

At step S208, the acquired parameters are corrected based on an original parameter model, converted into target parameters of received value corresponding to a position and a component, and stored in a memory of the mobile phone. The level value of the received signal may be acquired, and the acquired level value may be stored as a target level value for subsequent matching.

At step S209, after the acquisition is completed, the sensing control mode may be enabled, that is, a corresponding to-be-controlled function may be performed by a sensing operation.

At step S210, when the user or the object approaches or contacts the mobile phone, the level value of the received signal on the corresponding target antenna loop of the mobile phone is detected.

At step S211, the acquired level value is compared with the stored target level value, wherein if the two are consistent or within a specified threshold range, the comparison result is transmitted to a baseband module of the mobile phone, and if the two are inconsistent or exceeds the range, then a response or prompt would not be provided.

At step S212, according to a processing result of a baseband module, control of a corresponding mobile phone function is realized, that is, a configured related function is invoked.

Figure 3:
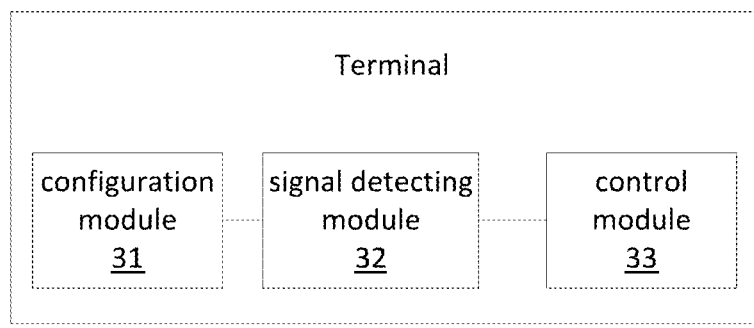
FIG. 3 is a schematic diagram illustrating a structure of a terminal according to an embodiment of the present disclosure.

FIG. 3 is a schematic diagram illustrating a structure of a terminal according to an embodiment of the present disclosure.

As shown in FIG. 3, a terminal according to an embodiment of the present disclosure may include a configuration module 31, a signal detecting module 32, and a control module 33.

The configuration module 31 is configured to configure a to-be-controlled function (for example, a lock screen function) of the terminal, a target sensing object (for example, an LTE antenna) that triggers control of the to-be-controlled function and a corresponding target object to be sensed (for example, a hand or an electronic apparatus), and a target antenna loop (e.g., an LTE antenna loop) on the terminal corresponding to the target sensing object and the target object to be sensed. During an approach or contact process of the configured target sensing object and the configured target object to be sensed, an interference signal acting on the target antenna loop is generated, thereby affecting the signal parameter of the received signal on the target antenna loop. The target sensing object and the target object to be sensed may approach or contact in advance, and a received signal on the target antenna loop may be measured during the approach or contact process to obtain a target signal parameter, which may be regarded as a reference parameter.

The signal detection module 32 is configured to detect a received signal on a target antenna loop in the terminal and acquire a signal parameter of the received signal.

The control module 33 is configured to determine whether the signal parameter of the received signal matches a preset target signal parameter, and triggering control of a to-be-controlled function of the terminal when the signal parameter of the received signal matches the preset target signal parameter.

When configuring a target sensing object for a to-be-controlled function, the configuration module 31 may configure the target sensing object as an antenna on the target antenna loop and/or at least one interference source component within the terminal.

The target object to be sensed may include at least one of a body part and an object external to the terminal.

For example, the target object to be sensed may include at least one of a hand, a face, or may be any part of a human body. In addition, the target object to be sensed may include at least one of a desktop (including a desktop of various materials or shapes), a wallet, a clothes pocket, and an electronic apparatus.

The target antenna loop may be a communication antenna loop (including but not limited to a WCDMA/CDMA/GSM/LTE antenna loop) or a functional antenna loop (including but not limited to a GPS/WIFI/Bluetooth antenna loop).

The interference source component may include but is not limited to at least one of: a camera, a speaker, a motor, a backlight module, a touch screen, a USB module, a GPS chip, a WIFI chip, a fingerprint identification chip, and a Bluetooth chip. One or more interference source components may be selected.

The received signal on the detected target antenna loop is reference signal transmitted from a signal transmitting circuit of the target antenna loop and connected to a signal receiving circuit of the target antenna loop, that is, the target antenna loop may implement reception of the received signal by self-transmitting and self-receiving and acquire a signal parameter of the received signal. Theoretically, the signal parameter may be any parameter that may reflect the cooperation between the external object to be sensed and the sensing object in the terminal, for example, may be a noise parameter or a level value of the received signal.

The signal detecting module 32 may be configured to perform M scans on the received signal on the target antenna loop at at least one preset frequency point, and acquiring M level values of the received signal at the at least one preset frequency point respectively, wherein M is an integer greater than or equal to 1.

For example, the signal detecting module 32 performs M scans on the received signal on the target antenna loop at a preset frequency point, and acquires M level values of the received signal at the preset frequency point. For another example, the signal detecting module 32 performs M scans on the received signal on the target antenna loop at least two preset frequency points, and acquires M level values of the received signal respectively at the at least two preset frequency points.

The signal detection module 32 may configure a number of preset frequency points and a number of scans at each preset frequency point according to a specific need.

When M is equal to 1, that is, the received signal on the target antenna loop is scanned once at the at least one preset frequency point, the preset target signal parameter may include a target signal level value at the at least one preset frequency point. In this case, the control module 33 is configured to compare the level value of the received signal respectively obtained at the frequency point with the corresponding target signal level value at the preset frequency point, and determines whether the two are matched according to the comparison result. For example, whether the two are matched may be determined according to whether a difference between the two is within a preset range, or according to a size relationship of the two, and the like.

When M is greater than 1, that is, at least two scans are performed on the received signal on the target antenna loop at the at least one preset frequency point, and level values of at least two received signals are acquired, and the preset target signal parameter may include at least two target signal level values at the at least one preset frequency point. In this case, the control module 33 is configured to compare a level fluctuation profile formed based on level values of at least two received signals with a target level fluctuation profile formed based on the at least two target signal level values.

The control module 33 may compare by selecting a single or multiple level values according to a specific need, or through a level fluctuation profile. When comparing with a plurality of level values or comparing with a level fluctuation profile, a movement trend or the track state between the sensing object in the terminal and the external object to be sensed may be reflected to some extent.

Figure 4:
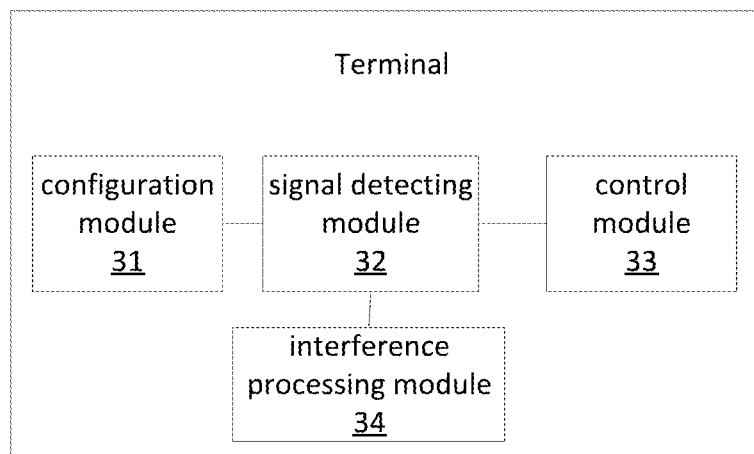
FIG. 4 is a schematic diagram illustrating a structure of a terminal according to another embodiment of the present disclosure.

FIG. 4 is a schematic diagram illustrating a structure of a terminal according to another embodiment of the present disclosure.

Referring to FIG. 4, the terminal according to an embodiment of the present disclosure may further include an interference processing module 34. Before the signal detection module 32 detects the received signal on the target antenna loop in the terminal (for example, when the terminal is powered on, or when the terminal detects a relatively large change in its position), the interference processing module 34 acquires interference signals inside and external to the terminal; and obtains a harmonic frequency of each interference signal, and determines whether the harmonic frequency is within a working frequency range of the terminal, wherein if the harmonic frequency is within the working frequency range of the terminal, a frequency point within the working frequency range corresponding to the harmonic frequency is marked as the interference frequency point, to avoid scanning at these interference frequencies. In this way, when selecting the preset frequency points afterwards, the preset frequency points may be selected from each frequency point in the working frequency band range that is not marked as the interference frequency point.

The interference processing module 34 may eliminate an interference signal by a manner described in the foregoing embodiments, and the details thereof will not be repeated herein again.

Figure 5:
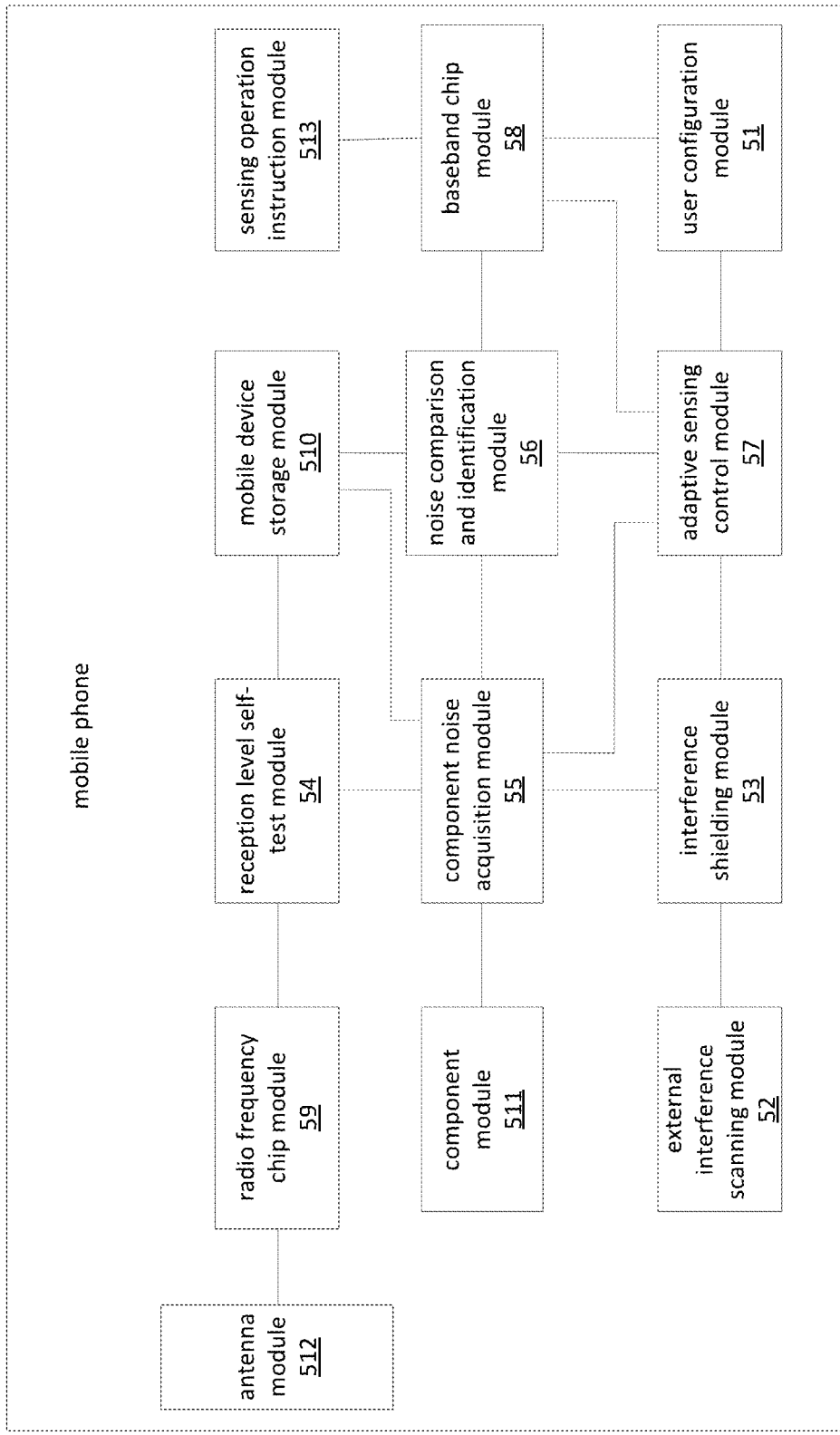
FIG. 5 is a schematic diagram illustrating a structure of a terminal according to still another embodiment of the present disclosure.

FIG. 5 is a schematic diagram illustrating a structure of a terminal according to still another embodiment of the present disclosure.

Based on the foregoing embodiments, this embodiment further exemplifies the structure of the terminal by taking a case where the terminal is a mobile phone as an example.

As shown in FIG. 5, the mobile phone according to this embodiment may include: a user configuration module 51 (corresponding to the configuration module 31 in the foregoing embodiment), an external interference scanning module 52, an interference shielding module 53 (the external interference scanning module 52 and the interference shielding module 53 corresponds to the interference processing module 34), a reception level self-test module 54, and a component noise acquisition module 55 (the reception level self-test module 54 and the component noise acquisition module 55 correspond to the signal detecting module 32 in the foregoing embodiment), a noise comparison and identification module 56, an adaptive sensing control module 57 (the noise comparison and identification module 56 and the adaptive sensing control module 57 correspond to the control module 33 in the foregoing embodiment), a baseband chip module 58, a radio frequency chip module 59, a mobile device storage module 510, a component module 511 (i.e., may be configured as an interference source component for the sensing object), an antenna module 512 (including but not limited to a communication antenna and a functional antenna), and a sensing operation instruction module 513.

The user configuration module 51 is configured to provide a configuration interaction interface, and the user may configure a mobile phone function which need to be performed in a screen-off state or a screen-on state, an antenna area (i.e., the antenna loop), a type of contact object (such as the human body), a sensing component or the antenna to be detected, and so on. It is also possible to configure parameters and sensitivity related to sensing identification (for example, level values and associated level value thresholds). The sensitivity is used to achieve precision control. For example, a range of a difference between detected parameters (e.g., level values) and preset target parameters (e.g., level thresholds) may be configured, to configure the accuracy of the control.

A configuration that may be made by the user through the interface provided by the user configuration module 51 are as described in the foregoing embodiments, and will not be repeated herein again.

The external interference scanning module 52 and the interference shielding module 53 are adjacent to each other, and may eliminate the influence of external noise interference and noise interference from the mobile phone itself, and shield external interference signals, interference frequencies and harmonics thereof, by referring to the operations described in steps S204 and S205 of FIG. 2, such that the scanning operation of the received signal on the target antenna loop is performed on an non-interfering frequency and channel. A specific operation mode of the external interference scanning module 52 and the interference shielding module 53 will not be repeated herein again.

The reception level self-test module 54 is connected to the radio frequency chip module 59 and the component noise acquisition module 55, and is used for scanning the receiving frequency of the modulated and unmodulated signals on the target antenna loop, and is further used for acquiring a change of signal levels of received signals on the target antenna loop after approaching or contacting a human body or other objects. The reception level self-test module 54 performs a self-transmitting and self-receiving loop sweep operation by controlling the receiver in the RF chip module 59 to scan, such that the mobile phone switches to a certain standard, frequency band, bandwidth, start and stop frequency point or channel. The reception level self-test module 54 first configures a basic signal strength level (e.g., −90 dB). The basic level scanned by the reception level self-test module 54 is different for different standards (e.g., WCDMA/CDMA/GSM/LTE) or other wireless transmission modes (e.g., WIFI/BT/GPS). When the received signal is not detected or the current noise floor is too large, the basic level may be turned up or down, and an adjustment range is, for example, between −50 dB and −110 dB. For a GPS channel, the base level may be adjusted to a lower range, for example, between −110 dB and −150 dB. The level of the received signal may be a main set antenna level or a diversity antenna level. The frequency sweep signal may be a carrier signal or a non-carrier signal. The scanning speed may be adjusted by scanning stepping and a number of scanning frequency points.

During a scanning process, a number of scanning frequencies and samples acquired may be automatically selected or averaged according to a change of acquired values, to prevent unstable factors or abnormal external interfering factors. If the level values of the received signals scanned for a same frequency point in two times are the same, this may indicate that the acquisition is stable, and a third scan is not required. If a difference between the key acquisition points in the two scans is large, then more scans are performed until a regular signal value is obtained.

The reception level self-test module 54 inputs a basic level signal to the front end of the mobile phone through a signal transmission circuit of the target antenna loop, the mobile phone input the signal to a band pass filter, a LNA amplifier, and then to a frequency variable local oscillator for frequency mixing, to obtain an intermediate frequency signal of a corresponding frequency band. The intermediate frequency signal is subjected to a post-stage filtering and A/D conversion, and then enters a gain variable amplifier to arrive at a level acquisition and reporting module for received signals. The reception level self-test module 54 may obtain different intermediate frequency signals by continuously adjusting the local oscillator frequency, and then acquire the reception level values of respective frequency points.

When the mobile phone is in standby mode or working in a corresponding mode and the interference source component in the mobile phone is in a sleep mode, the antenna on the antenna loop may be used as the sensing object. When the mobile phone contacts a human hand, a human body, a desktop, or other platforms or devices, the reception level self-test module 54 detects a level change of received signals of a corresponding area of the mobile phone antenna before and after the contact or approaching. The reception level self-test module 54 performs a full channel or partial channel scan on a certain frequency band before and after sensing, and identifies a reception level fluctuation profile or a level threshold change. When a waveform conforms to an identification feature, or when reception levels of one or more frequency point changes to a certain threshold range, a corresponding sensing operation may be triggered.

The component noise acquisition module 55 is connected to the reception level self-test module 54, the noise comparison and identification module 56, and the mobile device memory module 510, and is configured to receive a change in the level value detected by the reception level self-test module 54. The component noise acquisition module 55 converts the change in level value to a noise parameter value of a corresponding component and frequency point, and stores the noise parameter value in the mobile device storage module 510. The component noise acquisition module 55 may be omitted.

When the mobile phone is in a standby mode or working in a corresponding mode and a mobile phone component is in a working state, for example, when there is an incoming call, and the mobile phone speaker rings or the motor vibrates, at this time, if the mobile phone is placed on a corresponding platform or a human hand is approaching, then the component noise acquisition module 55 enables the reception level self-test module 54, to scan a received signal in a corresponding frequency band. A scanned value after the contact is compared with a scanned value before the contact, to identify a reception level fluctuation profile or a level threshold change before and after the contact. When a waveform conforms to the identification feature after the component is activated, or when reception levels of one or more frequency point changes to a certain threshold range, a corresponding sensing operation may be triggered.

The noise comparison and identification module 56 is connected to the component noise acquisition module 55 and the adaptive sensing control module 57, and is configured to compare acquired signal parameters (e.g., level values or noise parameters) with stored parameters for a model (i.e., corresponding target signal parameters). If the two are consistent or within a specified threshold range, the comparison result is transmitted to the adaptive sensing control module 57. If the two are inconsistent or out of range, no response or prompt is given.

Since the mobile phone hardware itself and the component itself have a certain noise floor, the noise comparison and identification module 56 first needs to subtract the noise corresponding to no object or human body from the acquired result, leaving only the increment of the object or the human body after approaching, and perform comparison, identification and determination based on the incremental change.

In addition, since there is an error in the detection process, a certain difference may exist between the detected reception value and the parameter value of a model stored in the mobile phone. Therefore, when the parameters are compared, a certain threshold fluctuation range may be adopted, and detected data within the threshold range is valid, thus a corresponding instruction operation will be enabled.

The adaptive sensing control module 57 is connected to the user configuration module 51, the baseband chip module 58, and other sensing acquisition and identification modules, and is configured to sense the detected adaptive control. The adaptive sensing control module 57 is further configured for sensing control of different operational instructions. The adaptive sensing control module 57 is configured to perform coordinated control of each sensing control module and send a control instruction to the baseband chip module 58.

The baseband chip module 58 is connected to the adaptive sensing control module 57 and the user configuration module 51, and is configured to receive an instruction of the user configuration module 51, and control each module of the mobile phone to perform a corresponding operation according to the control instruction of the sensing control module 57. The baseband chip module 58 is further configured to detect the start and stop of various components and to receive sensing control during acquisition to control the operation of the various components.

The radio frequency chip module 59 is connected to the reception level self-test module and the antenna module 512, and is configured for scanning and detecting external interference signals. The RF chip module 59, together with the antenna module 512 and a RF front-end circuit, form a closed antenna loop for detecting the received signal level.

The mobile device storage module 510 is connected to the reception level self-test module 54 and the component noise acquisition module 55, and is configured to store changed parameters of noises and data models of the antenna and other component the mobile phone before and after the user or other object contacts or approaches the antenna or other part.

The component module 511 is connected to the component noise acquisition module 55 and is an interference source component that may be configured as a sensing object. The component module 511 may include a motor, an LCD, a front camera, a rear camera, a speaker, a fingerprint chip, a USB module, a GPS chip, a WIFI chip, a radio frequency cellular chip, and an antenna in the mobile phone. These devices and chips are susceptible to external touch during operation, resulting in regular changes in the reception level on a particular antenna loop within the mobile phone.

The antenna module 512 is connected to the radio frequency chip module 59, and is configured to receive and transmit signals of the mobile communication device, and acquire external electromagnetic interference signals. In addition, the antenna module 512 may also be configured as a sensing medium for a human body or an object which generate a noise.

The sensing operation instruction module 513 is connected to the baseband chip module 58 and is configured for sensing control of each function module of the mobile phone, for example, starting an application, turning on or off a wireless function module (for example, Bluetooth, WIFI, GPS, etc.), connecting or disconnecting a wireless function, the mobile phone configuration entering a certain configuration mode (for example, an answer mode, a flight mode, a silent mode). In addition, the sensing operation instruction module 513 may also control a certain function of the mobile phone, for example, unlocking the mobile phone, turning off the screen, lighting the screen, and the like.

Based on the terminal in the embodiment of the present disclosure shown in FIG. 5, the detection results in some application scenarios are tested.

Figure 6:
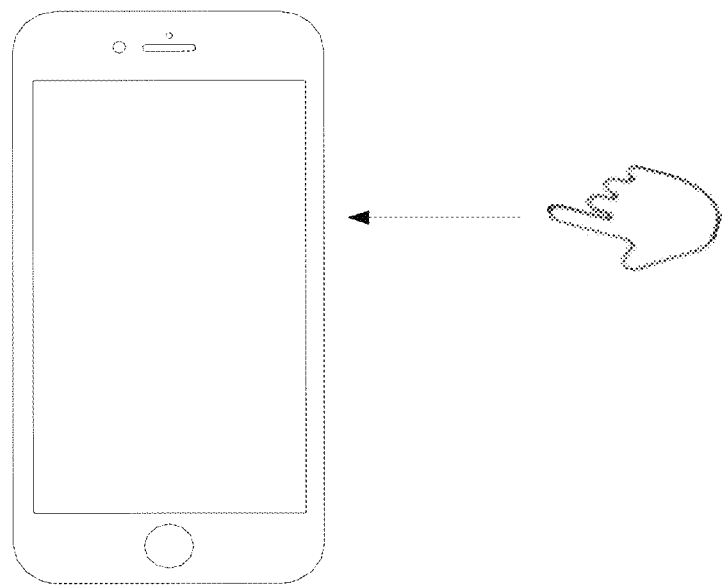
FIG. 6 is a schematic diagram illustrating approach of a hand of a user to a terminal according to an embodiment of the present disclosure.
Figure 7:
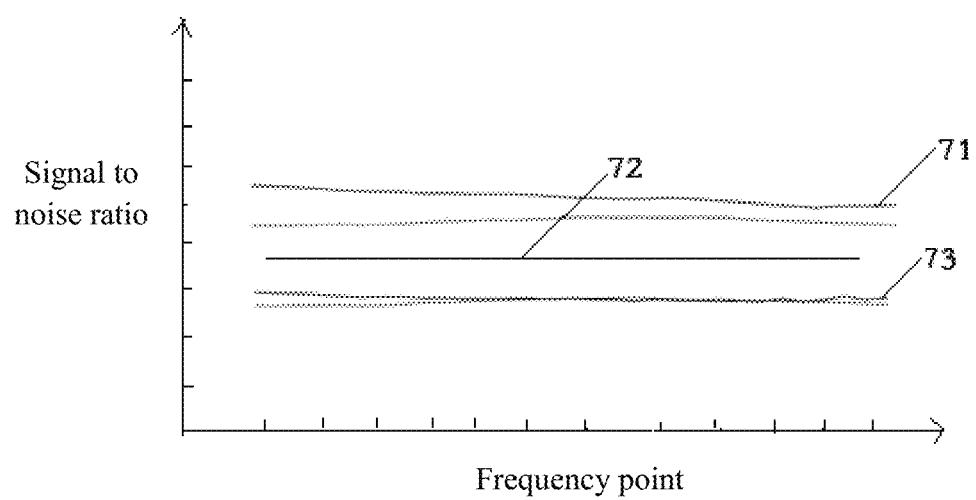
FIG. 7 is a diagram illustrating a fluctuation of reception levels in the scenario shown in FIG. 6.

FIG. 6 is a schematic diagram illustrating approach of a hand of a user to a terminal according to an embodiment of the present disclosure, and FIG. 7 is a diagram illustrating a fluctuation of reception levels in a scenario shown in FIG. 6.

In a case where all mobile phone components are in a dormant state, while a communication antenna or wireless antenna (e.g., a GSM antenna, a WCDMA antenna, a LTE antenna, a WIFI antenna, a BT antenna, and a GPS antenna) of the mobile phone is in a standby mode, when a hand approaches to different antennas of the mobile phone or a hand is holding the mobile phone and covering different antennas, a ground loop is formed due to the conductivity of the human body, and a feedback is generated on the radiation signal of the antenna. The value of the reception level acquired by the mobile phone itself (i.e., the level of the received signal on the target antenna loop) may vary greatly before and after the hand approaches or contacts the mobile phone. In FIG. 7, 71 is a reception level value on the antenna receiving loop when the hand approaches the mobile phone, 72 is a level reference value, and 73 is a reception level value on the receiving loop in a low noise and non-contact case.

Table 1 shows the received sensing values in different sensing scenarios:

TABLE 1

| sensing scenarios | Acquired values (dB) | Changed values (dB) |
|---|---|---|
| Basic level values | −96 | |
| Hand moving away from the mobile phone | −94.39 | −1.61 |
| Hand covering the antenna | −97.01 | 1.01 |
| Hand being above the mobile phone with a distance | −94.57 | −1.43 |
| Hand holding the mobile phone with the LCD toward the air | −96.55 | 0.55 |
| The LCD of the mobile phone toward the air and the phone contacting the hand | −95.98 | −0.02 |
| The LCD of the mobile phone toward the air and the phone being away from the hand with a small distance | −91.19 | −4.81 |

A hand approaching or contacting a corresponding area of the mobile phone may produce a change in receiving parameters, and may detect if a hand is approaching or contacting the mobile phone by comparing the change in the parameter to a pre-stored or standard parametric model. Through a determination by different thresholds for change amplitude, different approach directions and distances may be further identified, and then mapped to a sensing instruction operation to control a corresponding function of the mobile phone.

Of course, this example is not limited to a hand, the same applies to other parts of the human body.

Figure 8:
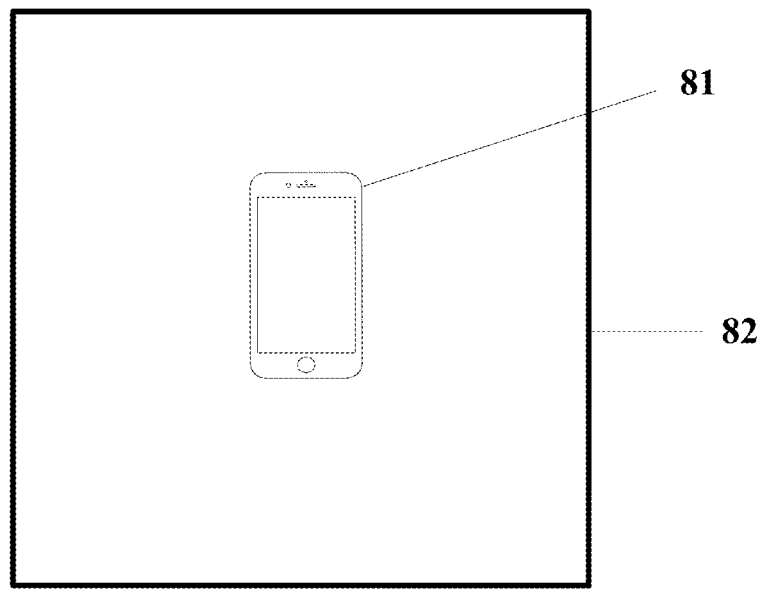
FIG. 8 is a schematic diagram illustrating a terminal being in a desktop according to an embodiment of the present disclosure.
Figure 9:
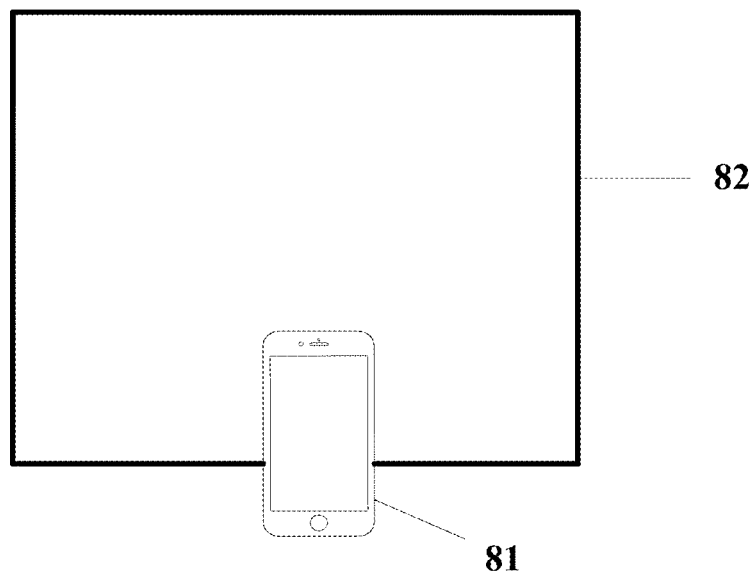
FIG. 9 is a schematic diagram illustrating an antenna portion of a terminal being external to a desktop according to an embodiment of the present disclosure.
Figure 10:
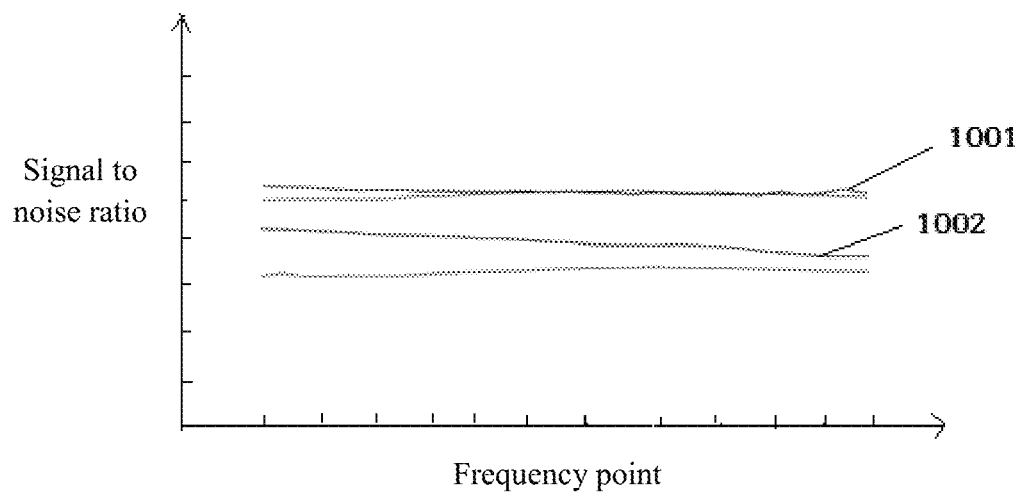
FIG. 10 is a diagram illustrating a fluctuation of reception levels in the scenarios shown in FIG. 8 and FIG. 9.

FIG. 8 is a schematic diagram illustrating a terminal being in a desktop according to an embodiment of the present disclosure, FIG. 9 is a schematic diagram illustrating an antenna portion of a terminal being external to a desktop according to an embodiment of the present disclosure, and FIG. 10 is a diagram illustrating a fluctuation of reception levels in the scenarios shown in FIG. 8 and FIG. 9.

When the mobile phone is placed on a desktop or an object, the antenna of the mobile phone is completely placed on a platform and being suspended relative to a certain area of the mobile phone, and the reception noise of the mobile phone is in two states.

As shown in FIG. 8, the mobile phone 81 is completely within the desktop 82. As shown in FIG. 9, a part of the mobile phone 81 is within the desktop 82. As shown in FIG. 10, 1001 is a schematic diagram illustrating a change in reception levels when the antenna is located in the desktop 82, and 1002 is a schematic diagram illustrating a change in reception levels when the antenna is located external to the desktop 82.

Figure 11:
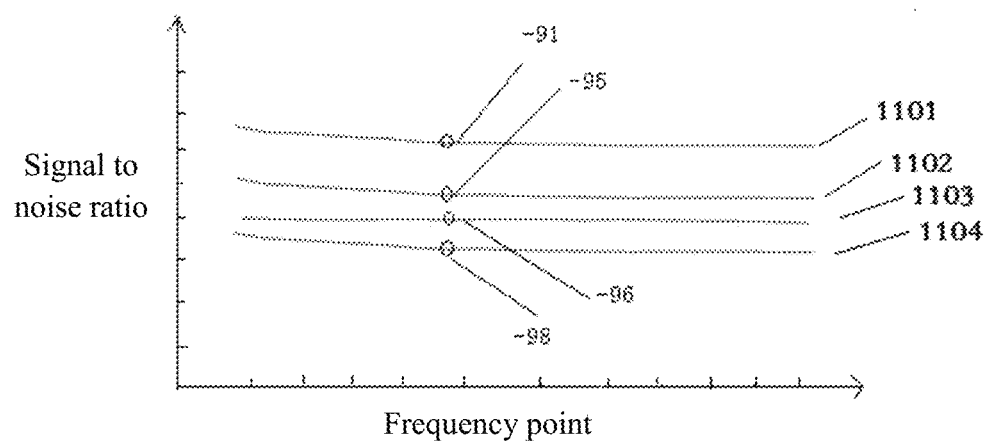
FIG. 11 is a schematic diagram illustrating fluctuations of reception levels corresponding to several different manners of a terminal being on a desktop according to an embodiment of the present disclosure.

FIG. 11 is a schematic diagram illustrating fluctuations of reception levels corresponding to several different manners of a terminal being on a desktop according to an embodiment of the present disclosure.

When the mobile phone 81 is placed on the desktop 82, there are two placement manners: the antenna is placed toward the air and the LCD is placed toward the air, and the two placement manners would also result in two reception levels and noise interference. As shown in FIG. 11, 1101 is a schematic diagram illustrating reception level changes when the antenna is placed external to the desktop, 1102 is a schematic diagram illustrating reception level changes when the back of the mobile phone is placed on the desktop, 1103 is a reference value of the target reception level, and 1104 is a schematic diagram illustrating a change in reception levels when the mobile phone is placed on the desktop with the LCD toward the air.

Therefore, different receiving parameter values may be detected for different placement manners and different orientations of the mobile phone, that is, activation and deactivation of sensing control instructions may be implemented by different placement manners of the mobile phone.

Figure 12:
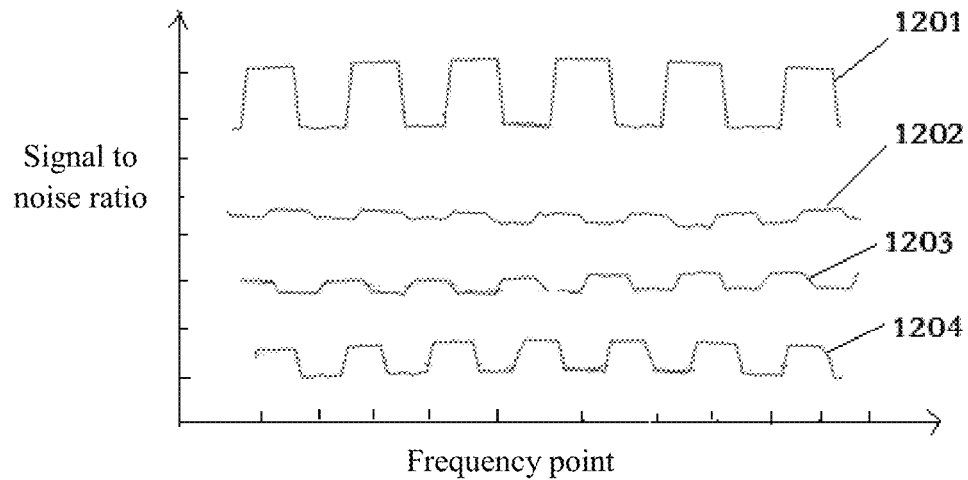
FIG. 12 is a diagram illustrating a fluctuation in reception levels when a motor of a terminal is used as a sensing object according to an embodiment of the present disclosure.

FIG. 12 is a diagram illustrating a fluctuation in reception levels when a motor of a terminal is used as a sensing object according to an embodiment of the present disclosure.

When there is an incoming call or an alarm occurs, a built-in motor of the phone periodically vibrates. In this case, the user does not need to activate the power button, and does not need to light the screen of the phone or perform other touch operations, either; the user just need to place the phone in different positions, or approach to a top of the phone with a hand, or use a different holding manners with the hand, or place it on different platforms, the sensing control module 57 (see FIG. 5) would detect received waveforms change periodically in various forms and amplitudes.

As shown in FIG. 12, 1201 is a schematic diagram illustrating the reception level change when the mobile phone is placed on the desktop and the motor is vibrating, and 1202 is a schematic diagram illustrating the reception level change when the mobile phone antenna is suspended and placed on the desktop and the motor is vibrating, 1203 is a schematic diagram illustrating the target reception level reference value when the hand is holding the mobile phone and the antenna is suspending, 1204 is a schematic diagram illustrating the reception level change when the hand is holding the lower part of the mobile phone and the motor is vibrating.

Different approaching or placement manners may be detected by detecting different pulse waveforms and amplitudes. Each manner may be associated with a certain function of the mobile phone, for example, the manner indicated by 1201 is configured to automatically answering, the manner indicated by 1202 is configured to refuse, the manner indicated by 1203 is configured to be mute, and the manner indicated by 1204 is configured to entrance of the flight mode. Therefore, when the user places the mobile phone in different positions, or holds the mobile phone with different manners, the mobile phone may be automatically triggered to enter a corresponding function and mode, thereby realizing intelligent automatic sensing control.

Figure 13:
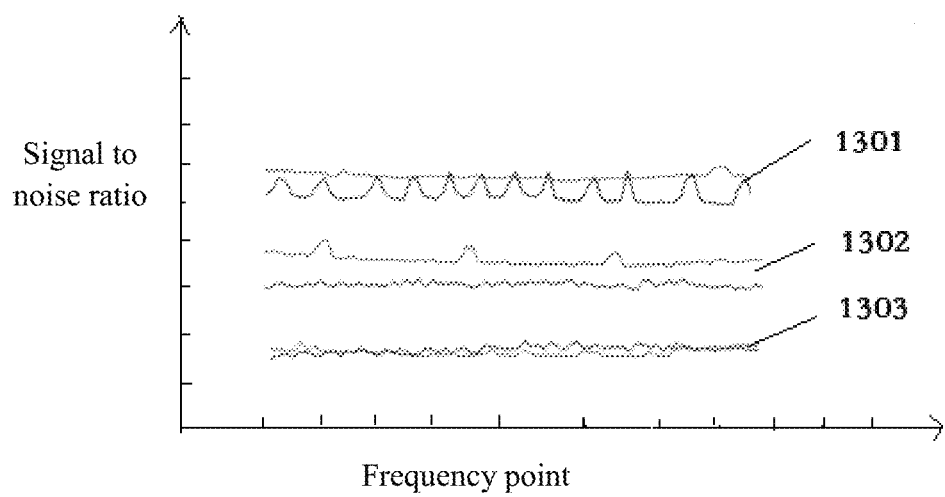
FIG. 13 is a diagram illustrating a fluctuation of reception levels when a fingerprint chip of a terminal is used as a sensing object according to an embodiment of the present disclosure.

FIG. 13 is a diagram illustrating a fluctuation of reception levels when a fingerprint chip of a terminal is used as a sensing object according to an embodiment of the present disclosure. The basic principle thereof is substantially the same as the example described in connection with FIG. 12, and the details will not be repeated herein again.

Figure 14:
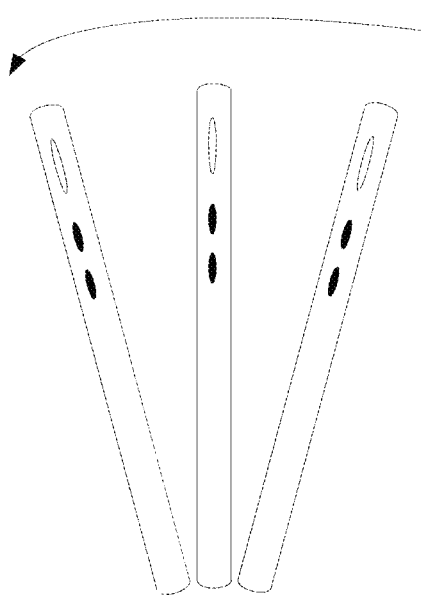
FIG. 14 is a schematic diagram illustrating a swing of a terminal according to an embodiment of the present disclosure.
Figure 15:
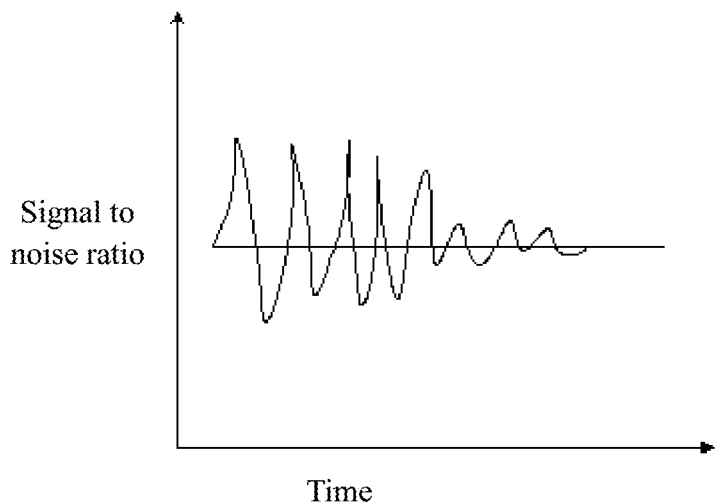
FIG. 15 is a diagram illustrating a fluctuation of reception levels in the swinging process of the terminal shown in FIG. 14.

FIG. 14 is a schematic diagram illustrating a swing of a terminal according to an embodiment of the present disclosure, and FIG. 15 is a diagram illustrating a fluctuation of reception levels in the swinging process of the terminal shown in FIG. 14.

The mobile phone may be in a screen-on state or a screen-off state, and the main frequency clock of mobile phone LCD has an interfering influence on the received signal, and the optical drive chip also has an interfering influence on the received signal. This kind of noise interference has a radiation effect, which is reflected when someone approaches or contacts, and thereby the interference signal may be transferred to the receiving loop of the mobile phone through crosstalk.

In this case, the user does not need to click any key or button of the mobile phone, and the user just need to place the phone in different positions, or approach to a top of the phone with a hand, or use a different holding manners with the hand, or place it on different platforms, the sensing control module 57 (see FIG. 5) would detect the change threshold of the main set or diversity of a certain low frequency channel or frequency point (such as 877.6 MHz) at the reference level, which may be compared with the pre-stored reference threshold to obtain the current placement manner or hand-holding manner, enabling gesture identification. Table 2 shows the received sensing values in different sensing scenarios:

TABLE 2

| sensing scenarios | Acquired values (dB) | Changed values (dB) |
|---|---|---|
| Basic level values | −95 | |
| Main set change in a case where the hand is holding the mobile phone and the screen is on | −92.83 | −1.61 |
| Diversity change in a case where the hand is holding the mobile phone and the screen is on | −91.19 | 1.01 |
| Main set change in a case where the hand is holding the mobile phone and the screen is off | −98.29 | −1.43 |
| Diversity change in a case where the hand is holding the mobile phone and the screen is off | −93.3 | 0.55 |

In this case, the user may also hold the top or bottom of the mobile phone in different holding manners and perform a swing operation (as shown in FIG. 14) to obtain a pulse curve whose duty value is periodically decremented (as shown in FIG. 15), to facilitate the user's custom configurations. As shown in FIG. 14, when the user is holding the bottom of the mobile phone and swinging the mobile phone repeatedly, a reception fluctuation signal with decreasing amplitude as shown in FIG. 15 may be obtained, which may be compared with predefined waveform parameters to trigger a corresponding sensing function instruction.

When two mobile phones need to communicate with each other, for example, to establish a Bluetooth connection, a WIFI direct connection, a hotspot sharing, an NFC mobile payment, etc., it is merely necessary to bring two mobile phones close to each other. Through mutual interference of the interference source components or antennas of the two mobile phones, which affects the change of the received signals, the direction, distance and movement trend of the current two approaching mobile phones may be determined, and then linked with a corresponding sensing control instruction, to realize the sensing function control between the two terminals.

Figure 16:
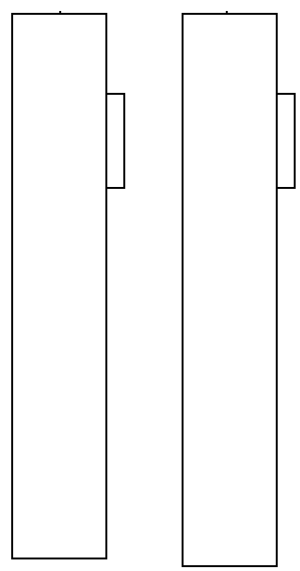
FIG. 16 is a schematic diagram illustrating two terminals facing a same direction and approaching each other according to an embodiment of the present disclosure.
Figure 17:
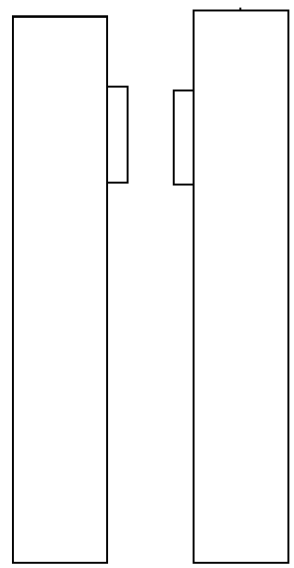
FIG. 17 is a schematic diagram illustrating two terminals being back-to-back and approaching each other according to an embodiment of the present disclosure.
Figure 18:
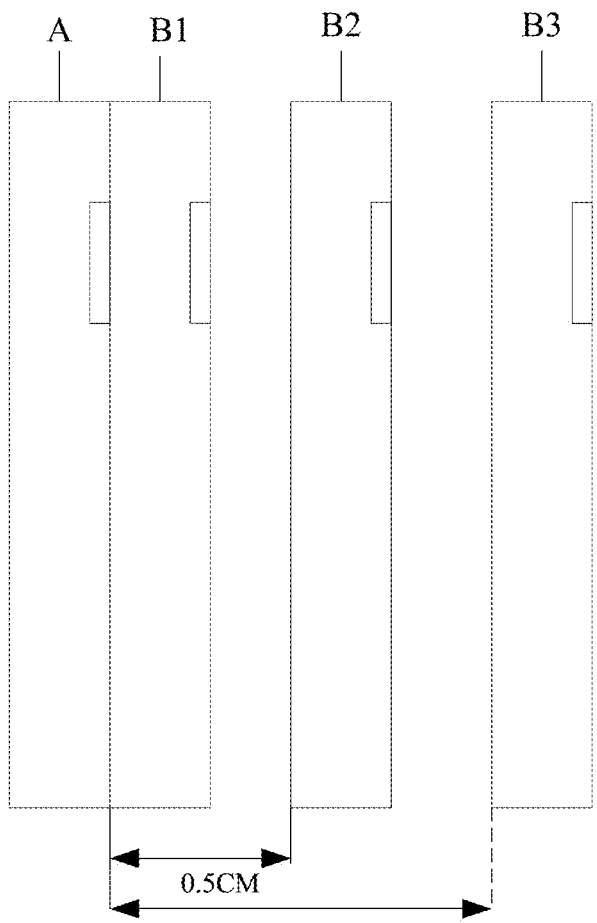
FIG. 18 is a schematic diagram illustrating two terminals facing a same direction and gradually approaching each other according to an embodiment of the present disclosure.

FIG. 16 is a schematic diagram illustrating two terminals facing a same direction and approaching each other according to an embodiment of the present disclosure, FIG. 17 is a schematic diagram illustrating two terminals being back-to-back and approaching each other according to an embodiment of the present disclosure, and FIG. 18 is a schematic diagram illustrating two terminals facing a same direction and gradually approaching each other according to an embodiment of the present disclosure. In FIG. 18, B1, B2, and B3 correspond to three different positions, respectively. After the terminal A is fixed at a certain position, the terminal B is located at a B1 position placed close to the terminal A, a B2 position shifted by 0.5 cm, and a B3 position shifted by 1 cm, respectively. Table 3 shows the received sensing values in different sensing scenarios.

TABLE 3

| Sensing scenarios | Acquired value (dB) | Changed value (dB) |
|---|---|---|
| Basic level value | −96 | |
| Two mobile phones being placed back-to-back with no distance | −61.43 | −34.57 |
| Two mobile phones facing a same direction with no distance | −93.54 | −2.46 |
| Being placed back-to-back with a distance of 1 cm | −72.56 | −23.44 |
| Being placed back-to-back with a distance of 0.5 cm | −85.81 | −10.19 |
| Being placed back-to-back with a distance greater than 2 cm | −94.23 | −1.77 |
| Facing a same direction with a distance of 0.5 cm | −93.19 | −2.81 |
| Facing a same direction with a distance greater than 0.5 cm | −92 | −4 |

The present disclosure provides a method of sensing and controlling a terminal or a wearable device in a suspend manner or a contact manner. By detecting an influence of mutual coupling between a component of the terminal and an external contact object on the antenna loop of the terminal, an operation of the user is identified and determined, and compared to various human-machine, machine-object, and machine-machine sensing models, to achieve various sensing instruction manipulations.

It will be apparent to those skilled in the art that the various modules or steps of the above embodiments of the present disclosure may be implemented by a general-purpose computing device, these modules or steps may be centralized on a single computing device or distributed across multiple computing devices. These modules or steps may be implemented by program code executable by a computing device, such that the program code may be stored in a computer storage medium (ROM/RAM, disk, optical disk) for execution by a computing device; and in some cases, the steps shown or described may be performed in a different order than that herein, or the modules or steps may be separately fabricated into individual integrated circuit modules, or multiple of the modules or steps may be fabricated into a single integrated circuit module. Therefore, the present disclosure is not limited to any specific combination of hardware and software.

The above content is a detailed description of the embodiments of the present disclosure in conjunction with specific implementations, but specific implementations of the present disclosure is not limited to the description. For those of ordinary skill in the art, several simple derivations or substitutions may be made without departing from the scope of the present disclosure, and the derivations or substitutions are construed as within the scope of the present disclosure.

What is claimed is:

1. A terminal control method, comprising: detecting a received signal on a target antenna loop in the terminal and acquiring a signal parameter of the received signal;
   determining whether the signal parameter of the received signal matches a preset target signal parameter, and triggering control of a to-be-controlled function of the terminal when the signal parameter of the received signal matches the preset target signal parameter,
   wherein the target antenna loop corresponds to a target sensing object in the terminal and a target object to be sensed external to the terminal, and the target sensing object and the target object to be sensed are preset according to the to-be-controlled function,
   an interference signal that acts on the target antenna loop is generated during an approach or contact process between the target sensing object and the target object to be sensed, and the interference signal affects the signal parameter of the received signal, wherein the target sensing object is at least one of: an antenna on the target antenna loop, and at least one interference source component in the terminal, and a noise signal reflected to a component of the target antenna loop is generated, when the interference source component is in operation, under an action of the target object to be sensed.

2. The terminal control method of claim 1, wherein the target object to be sensed comprises at least one of: a human body part and an object external to the terminal.

3. The terminal control method of claim 2, wherein in a case where the target object to be sensed comprises the human body part, the human body part comprises at least one of a hand and a face, in a case where the target object to be sensed comprises the object external to the terminal, the object external to the terminal comprises at least one of a desktop, a wallet, a clothes pocket, and an electronic apparatus.

4. The terminal control method of claim 1, wherein the received signal is a reference signal transmitted from a signal transmitting circuit of the target antenna loop and connected to a signal receiving circuit of the target antenna loop, and the signal parameter comprises a level value of the signal, the step of detecting the received signal on the target antenna loop in the terminal comprises:

performing M scans on the received signal on the target antenna loop at at least one preset frequency point, and acquiring M level values of the received signal at the at least one preset frequency point respectively, wherein M is an integer greater than or equal to 1.

5. The terminal control method of claim 4, wherein in a case where M is equal to 1, the preset target signal parameter comprises a target signal level value at the at least one preset frequency point, and the determining whether the signal parameter of the received signal matches the preset target signal parameter comprises:

comparing the level value of the received signal respectively acquired at the at least one preset frequency point with a corresponding target signal level value at the preset frequency point, in a case where M is greater than 1, the preset target signal parameter comprises at least two target signal level values at the at least one preset frequency point, and the determining whether the signal parameter of the received signal matches the preset target signal parameter comprises:

comparing a level fluctuation profile formed based on level values of at least two received signals with a target level fluctuation profile formed based on the at least two target signal level values.

6. The terminal control method of claim 4, wherein before the step of detecting the received signal on the target antenna loop in the terminal, the method further comprises:

acquiring interference signals inside and external to the terminal; and obtaining a harmonic frequency of each interference signal, and determining whether the harmonic frequency is within a working frequency range of the terminal, wherein if the harmonic frequency is within the working frequency range of the terminal, a frequency point within the working frequency range corresponding to the harmonic frequency is marked as the interference frequency point, wherein the at least one preset frequency point is a frequency point selected from each frequency point that is not marked as an interference frequency point within the working frequency band.

7. A terminal, comprising: a signal detection module configured to a received signal on a target antenna loop in the terminal and acquiring a signal parameter of the received signal;

a control module configured to determine whether the signal parameter of the received signal matches a preset target signal parameter, and trigger control of a to-be-controlled function of the terminal when the signal parameter of the received signal matches the preset target signal parameter, wherein the target antenna loop corresponds to a target sensing object in the terminal and a target object to be sensed external to the terminal, and the target sensing object and the target object to be sensed are preset according to the to-be-controlled function, an interference signal that acts on the target antenna loop is generated during an approach or contact process between the target sensing object and the target object to be sensed, and the interference signal affects the signal parameter of the received signal, wherein the target sensing object is at least one of: an antenna on the target antenna loop, and at least one interference source component in the terminal, and a noise signal reflected to a component of the target antenna loop is generated, when the interference source component is in operation, under an action of the target object to be sensed.

8. The terminal of claim 7, wherein the target object to be sensed comprises at least one of: a human body part and an object external to the terminal.

9. The terminal of claim 7, wherein the target antenna loop is a communication antenna loop or a functional antenna loop of the terminal, and the interference source component comprises at least one of: a camera, a speaker, a motor, a backlight module, a touch screen, a USB module, a GPS chip, a WIFI chip, a fingerprint identification chip, and a Bluetooth chip.

10. The terminal of claim 7, wherein the received signal is a reference signal transmitted from a signal transmitting circuit of the target antenna loop and connected to a signal receiving circuit of the target antenna loop, and the signal parameter comprises a level value of the signal, the signal detecting module is configured to perform M scans on the received signal on the target antenna loop at at least one preset frequency point, and acquiring M level values of the received signal at the at least one preset frequency point respectively, wherein M is an integer greater than or equal to 1.

11. The terminal of claim 10, wherein, in a case where M is equal to 1, the preset target signal parameter comprises a target signal level value at the at least one preset frequency point, and the control module is configured to compare the level value of the received signal respectively acquired at the at least one preset frequency point with a corresponding target signal level value at the preset frequency point; and in a case where M is greater than 1, the preset target signal parameter comprises at least two target signal level values at the at least one preset frequency point, and the control module is configured to compare a level fluctuation profile formed based on level values of at least two received signals with a target level fluctuation profile formed based on the at least two target signal level values.

12. A non-transitory computer storage medium, stored thereon a computer program, which causes, when executed by a processor, the processor to perform the terminal control method of claim 1.

* * * * *